(12) United States Patent
Ahmed

(10) Patent No.: US 11,656,335 B2
(45) Date of Patent: May 23, 2023

(54) SYSTEM AND METHOD FOR DETECTING AIRCRAFT SIGNATURES

(71) Applicant: Rohde & Schwarz GmbH & Co. KG, Munich (DE)

(72) Inventor: Sherif Sayed Ahmed, Starnberg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 251 days.

(21) Appl. No.: 16/292,472

(22) Filed: Mar. 5, 2019

(65) Prior Publication Data

US 2020/0284877 A1 Sep. 10, 2020

(51) Int. Cl.
*G01S 7/41* (2006.01)
*G01S 13/00* (2006.01)
*G01S 13/58* (2006.01)

(52) U.S. Cl.
CPC ............ *G01S 7/415* (2013.01); *G01S 13/003* (2013.01); *G01S 13/58* (2013.01)

(58) Field of Classification Search
CPC .......... G01S 13/931; G01S 7/032; G01S 7/03; G01S 13/584; G01S 7/352; G01S 13/87; G01S 13/34; G01S 13/003; G01S 7/417; G01S 7/411; G01S 7/415; G01S 7/41; G01S 13/32; G01S 13/58; G01S 13/88; G01S 7/4056; G01S 13/343; G01S 13/347; G01S 13/38; G01S 2013/0245; G01S 13/42; H01Q 21/064; H01Q 1/3233; H01Q 21/065; H04B 7/0413; G06N 20/00; G06N 3/02; G06N 3/08; G06N 3/0454; G05D 1/0202; G05D 1/102; G05D 1/106
See application file for complete search history.

(56) References Cited

U.S. PATENT DOCUMENTS

| 5,539,411 | A | * | 7/1996 | Yu | ............................ G01S 7/411 |
| | | | | | 342/54 |
| 6,653,970 | B1 | | 11/2003 | Mitra | |
| 11,199,618 | B2 | * | 12/2021 | Wang | ..................... G01S 13/931 |
| 2002/0167440 | A1 | * | 11/2002 | Baugh | ...................... G01S 7/023 |
| | | | | | 342/159 |

(Continued)

FOREIGN PATENT DOCUMENTS

CN 106932776 7/2017
CN 107450065 A 12/2017

(Continued)

OTHER PUBLICATIONS

EPO, "Extended European Search Report", EPO Application No. 19168026.3, dated Oct. 16, 2019.

(Continued)

*Primary Examiner* — Olumide Ajibade Akonai
(74) *Attorney, Agent, or Firm* — Potomac Technology Law, LLC

(57) ABSTRACT

A radar system for detecting aircraft signatures is provided. The system comprises a plurality of radar clusters where each radar cluster further comprises a plurality of transmit antennas and a plurality of receive antennas. In this context, the plurality of transmit antennas and the plurality of receive antennas are co-located within each radar cluster. Furthermore, the plurality of transmit antennas are time synchronized and/or phase coherent with the plurality of receive antennas.

14 Claims, 4 Drawing Sheets

(56) References Cited

U.S. PATENT DOCUMENTS

| | | | |
|---|---|---|---|
| 2007/0013575 A1* | 1/2007 | Lee | G01S 13/89 |
| | | | 342/194 |
| 2011/0187581 A1 | 8/2011 | Kempkemian et al. | |
| 2012/0019407 A1 | 1/2012 | Lesturgie | |
| 2016/0069992 A1* | 3/2016 | Rector | G01S 13/874 |
| | | | 342/59 |
| 2016/0084950 A1 | 3/2016 | Muller | |
| 2017/0285158 A1 | 10/2017 | Halbert | |
| 2018/0210067 A1* | 7/2018 | Bilik | G01S 13/87 |
| 2018/0259641 A1* | 9/2018 | Vacanti | G01S 13/34 |
| 2019/0011934 A1* | 1/2019 | DeBitetto | G05D 1/106 |
| 2019/0107424 A1* | 4/2019 | Welle | G01S 7/032 |
| 2020/0083979 A1* | 3/2020 | Roberts | B64D 7/00 |
| 2020/0103499 A1* | 4/2020 | Preece | G01S 13/867 |
| 2020/0158822 A1* | 5/2020 | Owens | G01S 7/415 |
| 2020/0158861 A1* | 5/2020 | Cattle | G01S 7/032 |
| 2020/0162489 A1* | 5/2020 | Bar-Nahum | G06N 20/00 |
| 2020/0233059 A1* | 7/2020 | Brett | G01S 13/28 |
| 2020/0256972 A1* | 8/2020 | Eckert | G01S 13/0209 |
| 2020/0408899 A1* | 12/2020 | Nanzer | G01S 13/931 |
| 2021/0405183 A1* | 12/2021 | Vossiek | G01S 13/003 |

FOREIGN PATENT DOCUMENTS

| | | |
|---|---|---|
| CN | 207096444 | 3/2018 |
| EP | 3367126 A1 | 8/2018 |
| FR | 2801109 A1 | 5/2001 |
| FR | 2927423 | 8/2009 |
| FR | 2942884 A1 | 9/2010 |
| FR | 2956907 A1 | 9/2011 |
| GB | 1529381 | 10/1978 |
| GB | 2242589 | 10/1991 |
| GB | 2517710 | 3/2015 |
| JP | 11125674 | 5/1999 |
| JP | 2004132827 | 4/2004 |
| JP | 2016217807 | 12/2016 |
| KR | 20070060881 | 6/2007 |
| WO | WO03079041 A2 | 9/2003 |
| WO | WO2012175819 A1 | 12/2012 |
| WO | WO2014187898 A1 | 11/2014 |
| WO | WO2017207716 A1 | 12/2017 |

OTHER PUBLICATIONS

Harman, "A Comparison of Staring Radars With Scanning Radars for UAV Detection", Proceedings of the 12th European Radar Conference, 978-2-87487-041-5, Paris, France, Sep. 2015.

Molchanov, et al., "Classification of small UAV s and birds by micro-Doppler signatures", Proceedings of he 10th European Radar Conference, 978-2-87487-033-0, Nuremberg, Germany, Oct. 2013.

* cited by examiner

SYSTEM AND METHOD FOR DETECTING AIRCRAFT SIGNATURES

TECHNICAL FIELD

The invention relates to a system and a corresponding method for detecting aircraft signatures, especially for detecting autonomous drones with silent operation as well as standard detection in restricted visibility.

BACKGROUND

With an increasing application of drones in the industrial and private sectors, there is a growing need to provide reliable detection schemes for preventing intrusion, industrial espionage and the like. Generally, radars along with multiple sensors (optical, sonar, infrared, etc.) are used in a detection system where multiple sensor data fusion is performed. However, such detection system fails to effectively identify the drone signatures (identification of the drone) in extreme operating environments, for instance under bad weather conditions when optical and infrared systems have limited visibility. In addition, the radar sensors are mostly mechanical range radars with limited signal analysis capabilities. As a counter measure, multistatic detection technique is introduced in radar detection systems to facilitate further signal analysis competency by means of beamforming. Disadvantageously, the effective beam formation requires a large number of antenna elements on the antenna array, which leads to a cost-intensive system.

For example, US 2017/0285158 A1 demonstrates multistatic drone detection in a radar system using beamforming where a three-dimensional field of surveillance having a volume exceeding one cubic kilometer is successively monitored.

Accordingly, there is a need to provide a system and a corresponding method for detecting aircraft signatures, particularly for robust detection of drone signatures in a cost effective manner.

SUMMARY

Embodiments of the present invention advantageously address the foregoing requirements and needs, as well as others, by providing a system and a corresponding method for detecting aircraft signatures, particularly for robust detection of drone signatures in a cost effective manner.

According to a first aspect of the invention, a radar system for detecting aircraft signatures is provided. The system comprises a plurality of radar clusters where each radar cluster further comprises a plurality of transmit antennas and a plurality of receive antennas. In this context, the plurality of transmit antennas and the plurality of receive antennas are co-located within each radar cluster. Advantageously, the co-located antennas deliver a confined structure so that the target radar cross sections observed by the antennas are nearly identical and hence improve the spatial resolution. In addition, the plurality of transmit and receive antennas form a plurality of radar resolution cells that significantly extend the radar coverage area.

Furthermore, the plurality of transmit antennas are time synchronized and/or phase coherent with the plurality of receive antennas. Preferably the transmit antennas and the receive antennas are time synchronized and/or are coherent in phase, where the time synchronization allows sufficient spatial diversity for the antennas and having phase coherent transmit and receive antennas further allows precision beam-forming. Particularly, the phase coherence between the transmit antennas and the receive antennas facilitates more comprehensive beam-formation and hence utilizes fewer array elements, which leads to a robust detection system with a substantial cost reduction.

According to a first preferred implementation form of said first aspect of the invention, the plurality of radar clusters are preferably stationary multistatic radar clusters. Advantageously, the antenna aperture dimension limitations of classical monostatic radar are overcome by means of distributed antennas for transmission and reception, which further enhance the robustness of the detection system.

According to a second preferred implementation form of said first aspect of the invention, the plurality of radar clusters are arranged in an arching formation to cover a portion of a potential aircraft fly-zone. Advantageously, the radar coverage area for detection is further extended.

According to a third preferred implementation form of said first aspect of the invention, the plurality of transmit antennas and the plurality of receive antennas are co-located on an antenna array, preferably on a sparse antenna array for digital beamforming. Advantageously, sparse arrays elements increase the resolution as the same amount of elements can be distributed over a larger antenna aperture. This effectively reduces the hardware costs since less elements can achieve the resolution of a conventional dense array with more elements.

According to a further preferred implementation form of said first aspect of the invention, the plurality of transmit antennas are configured to broadcast transmitter signals sequentially or simultaneously. In addition, the plurality of receive antennas are configured to receive the reflected transmitter signals sequentially or simultaneously. In this context, the simultaneous reception enables optimum use of the broadcasted transmitter signals whereas the sequential reception minimizes the hardware requirements. Advantageously, the system provides sufficient flexibility for detecting signatures on a case-by-case basis.

According to a further preferred implementation form of said first aspect of the invention, the system further comprises a processing unit, configured to determine a distance of an aircraft corresponding to a delay of the broadcasted and the reflected transmitter signals. In addition, the processing unit is further configured to detect a motion of the aircraft by analyzing Doppler shifts acquired from the reflected transmitter signals. In this context, the processing unit is configured to identify aircraft signatures to detect aircraft locations by determining movement signatures corresponding to the motion of the aircraft if the aircraft is moving. It is further advantageous that the processing unit is configured to identify aircraft signatures to detect aircraft locations by determining micro-Doppler signatures corresponding to micro-Doppler analysis of phase shifts if the aircraft is stationary. Hence, the micro-Doppler analysis of phase shifts inside the signal spectrum improves the detection sensitivity significantly since a drone even in stationary condition still puts off micro-Doppler signatures from its rotors.

According to a further preferred implementation form of said first aspect of the invention, the processing unit is further configured to utilize multiple chirp signals with a range of ramps and frequency levels to avoid aliasing at low frequencies and to obtain higher resolution. In this manner, aliasing in initial low frequency chirps is advantageously avoided, and by following such chirps with different higher frequency chirps, a higher resolution on any found objects from the first chirp is obtained.

According to a further preferred implementation form of said first aspect of the invention, the processing unit is further configured to interpret aircraft signatures from a set of user instructions based on a known location of the aircraft by means of cognitive intelligence. In this manner, artificial intelligence methods are used to train the detection algorithm on both raw data and reconstructed images to facilitate automated detection.

According to a further preferred implementation form of said first aspect of the invention, the system further comprises a plurality of multistatic transmit antennas and a plurality of multistatic receive antennas which are arranged in an arching formation. In this context, the plurality of transmit antennas are configured to broadcast in quick successions in order to cover the potential aircraft fly-zone in a very small total time frame. Advantageously, an effective detection with a few number of antenna elements can be achieved.

According to a further preferred implementation form of said first aspect of the invention, the aircraft signatures to be detected are drone signatures. Advantageously, a robust detection system for recognizing drone signatures is provided.

According to a second aspect of the invention, a method for detecting aircraft signatures in a radar system comprising a plurality of radar clusters each comprising a plurality of transmit antennas and a plurality of receive antennas is provided. The method performs the step of co-locating the plurality of transmit antennas and the plurality of receive antennas within each radar cluster. In this context, the plurality of transmit antennas are time synchronized and/or phase coherent with the plurality of receive antennas. It is particularly advantageous that the transmit antennas and the receive antennas are coherent in phase, which facilitates more comprehensive beam-formation and hence utilizes fewer array elements, eventually leads to a robust detection system with a substantial cost reduction.

According to a first preferred implementation form of said second aspect of the invention, the method further comprises the step of arranging the plurality of radar clusters in an arching formation to cover a portion of a potential aircraft fly-zone. Advantageously, the radar coverage area for detection is significantly extended.

According to a second preferred implementation form of said second aspect of the invention, the method further comprises the step of co-locating the plurality of transmit antennas and the plurality of receive antennas on an antenna array, preferably on a sparse antenna array for digital beam-forming. This effectively reduce the hardware costs since by means of sparse array, less elements can achieve the resolution of a conventional dense array with more elements.

According to a third preferred implementation form of said second aspect of the invention, the method further comprises the steps of broadcasting transmitter signals sequentially or simultaneously and receiving the reflected transmitter signals sequentially or simultaneously. In this context, the simultaneous reception enables optimum use of the broadcasted transmitter signals whereas the sequential reception minimizes the hardware requirements and hence sufficient flexibility is provided for detecting signatures on a case-by-case basis.

According to a further preferred implementation form of said second aspect of the invention, the method further comprises the steps of determining a distance of an aircraft corresponding to a delay of the broadcasted and the reflected transmitter signals and detecting a motion of the aircraft by analyzing Doppler shifts acquired from the reflected transmitter signals. Further advantageously the method comprises the steps of determining movement signatures corresponding to the motion of the aircraft if the aircraft is moving and determining micro-Doppler signatures corresponding to micro-Doppler analysis of phase shifts if the aircraft is stationary. Hence, the micro-Doppler analysis of phase shifts inside the signal spectrum improves the detection sensitivity significantly since a drone even in stationary condition still puts off micro-Doppler signatures from its rotors.

According to a further preferred implementation form of said second aspect of the invention, the method further comprises the step of utilizing multiple chirp signals with a range of ramps and frequency levels to avoid aliasing at low frequencies and to obtain higher resolution. In this manner, aliasing in initial low frequency chirps is advantageously avoided and by following such chirps with different higher frequency chirps, a higher resolution on any found objects from the first chirp is obtained.

According to a further preferred implementation form of said second aspect of the invention, the method further comprises the step of interpreting aircraft signatures from a set of user instructions based on a known location of the aircraft by means of cognitive intelligence. Advantageously, artificial intelligence methods are used to train the detection algorithm on both raw data and reconstructed images to facilitate automated detection.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Exemplary embodiments of the invention are now further explained with respect to the drawings by way of example only, and not for limitation. In the drawings.

DETAILED DESCRIPTION

Figure 1:
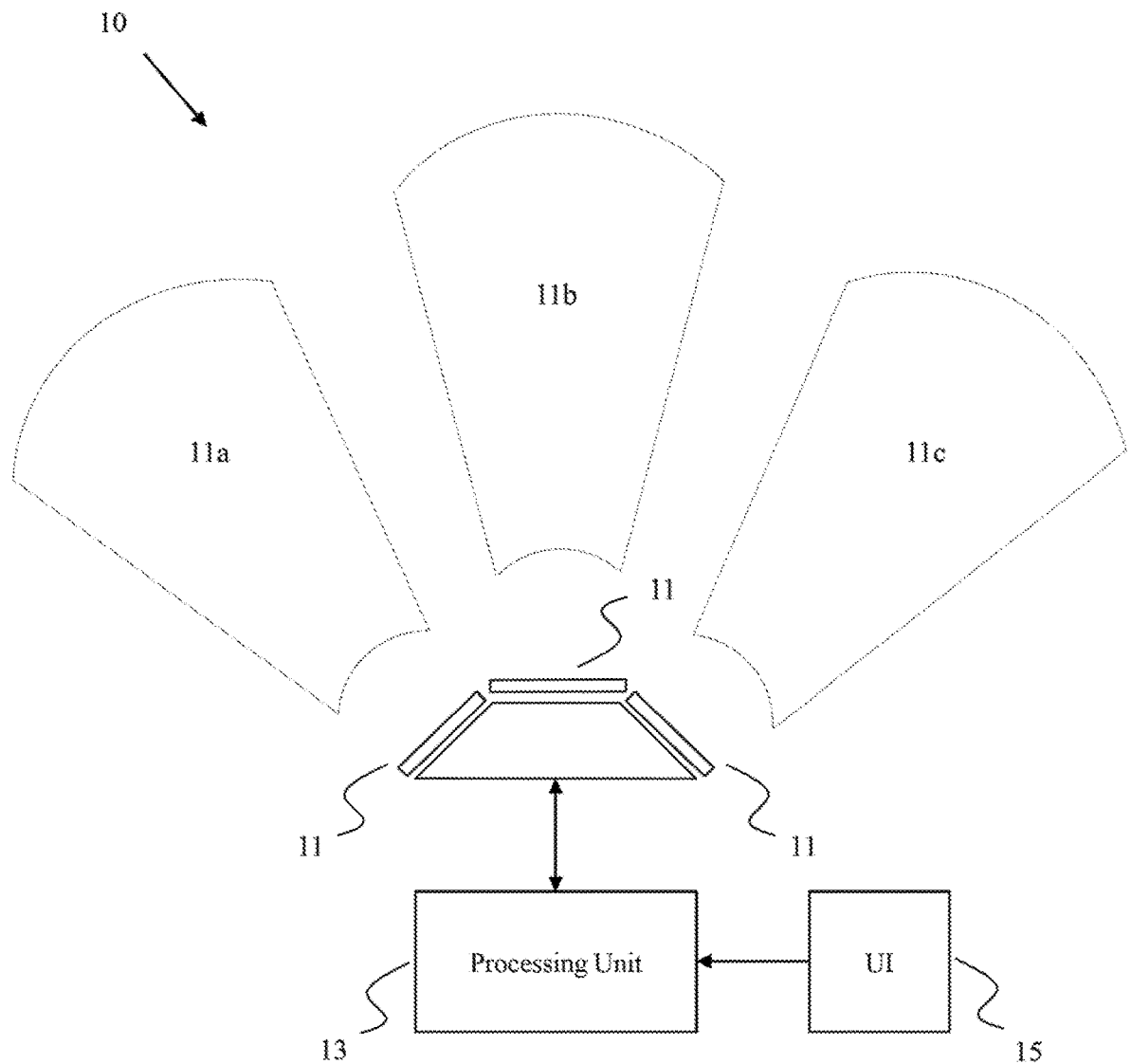
FIG. 1 shows a first exemplary embodiment of the system according to the first aspect of the invention.

First, we demonstrate the general construction and function of a first exemplary embodiment of the system of the first aspect of the invention, along FIG. 1. Along FIG. 2, the first exemplary embodiment of the system according to the first aspect of the invention is described in detail. After that, along FIG. 3, we demonstrate the general construction and function of a second exemplary embodiment of the system of the first aspect of the invention. Finally, with regard to the flow chart of FIG. 3, an exemplary embodiment of the method according to the second aspect of the invention is described.

Reference will now be made in detail to the embodiments of the present invention, examples of which are illustrated in the accompanying drawings. Similar entities and reference numbers in different figures have been partially omitted. However, the following embodiments of the present invention may be variously modified and the range of the present invention is not limited by the following embodiments.

In FIG. 1, a first exemplary embodiment of the inventive system 10 for detecting aircraft signatures is illustrated. The system 10 comprises a plurality of radar clusters 11 where each cluster further comprises a plurality of transmit antennas 21a, 21b, 21c and a plurality of receive antennas 22a, 22b, 22c, which are further illustrated along FIG. 2. The system further comprises a processing unit 13 and a user interface 15. The plurality of radar clusters are arranged in an arching formation to cover a portion 11a, 11b, 11c of a potential aircraft fly-zone. In this context, the radar clusters 11 are for instance square shaped panels and are preferably stationary multistatic radar clusters. Other shapes for the clusters 11 are also viable in the consideration of manufacturing process complexity and costs. The processing unit 13 and the user interface 15 are interconnected by means of standard transmission lines, for instance coaxial cables, optical fibers and so on. The processing unit 13 comprises, preferably, a Field Programmable Gate Array (FPGA) to perform digital signal processing.

Figure 2:
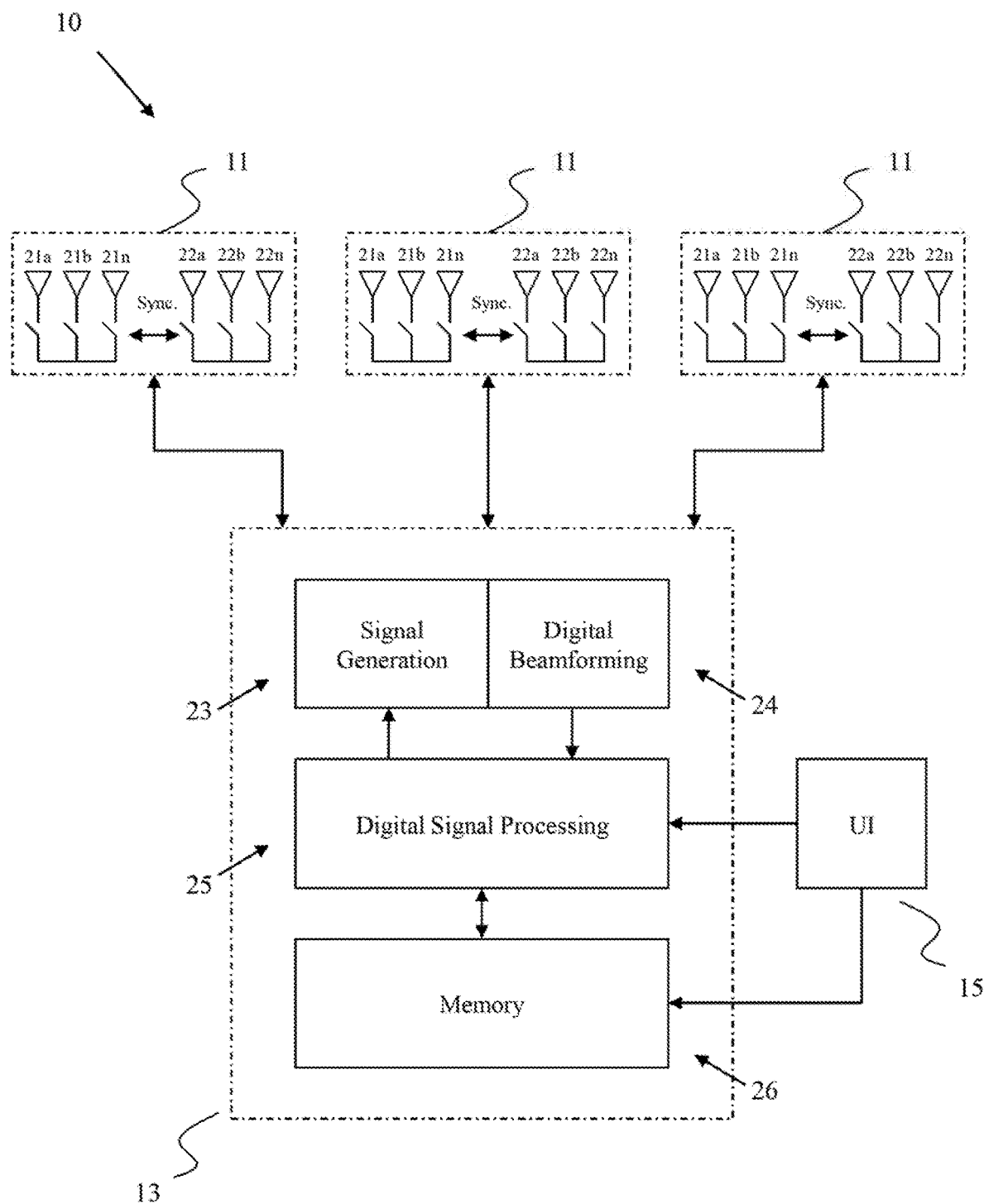
FIG. 2 shows a more detailed view of the first exemplary embodiment of the system according to the first aspect of the invention.

In FIG. 2, a more detailed view of the first exemplary embodiment of the inventive system 10 for detecting aircraft signatures is illustrated. Here, the internal components of radar clusters 11 and processing unit 13 are described in greater detail.

In this context, the plurality of transmit antennas 21a, 21b, 21c and the plurality of receive antennas 22a, 22b, 22c are co-located within a radar cluster on a sparse antenna array. The sparse array formation allows a comprehensive digital beam-formation with the minimum number of antenna elements and advantageously can achieve the resolution of a conventional dense array with more elements. Furthermore, it is important that the radar components operate together as well as in proper time and hence the transmit antennas 21a, 21b, 21c are time synchronized and phase coherent with the receive antennas 22a, 22b, 22c. For synchronization a simple coherent trigger generation is implemented by the processing unit 13 through its signal generation function 23. In addition to time synchronization, having phase coherent transmit and receive antennas further facilitate precise beam-formation.

Moreover, the processing unit 13 uses digital beam forming of the captured data through its digital beamforming function 24. The said captured data are essentially reflected transmit signals that are broadcasted sequentially or simultaneously from the plurality of transmit antennas 21a, 21b, 21c and are correspondingly received over the plurality of receive antennas 22a, 22b, 22c. During digital beam-formation, the processing unit 13 performs phase adjustments of received data sets through its signal processing function 25 to increase the power of a particular beam in the potential aircraft fly-zone, as soon as the signal processing function 25 compiles a multiple received data sets. It is particularly advantageous that multiple receiving antennas 22a, 22b, 22c are utilized for beamforming since the potential noise contribution is effectively minimized by means of destructive interference.

Further advantageously, the processing unit 13 detects not only the bulk motion of the aircraft from the constant Doppler frequency shift but also micro-motions such as vibrations or rotations of a rotating part from a stationary aircraft by means of micro-Doppler analysis. It is further implemented that artificial intelligence methods are utilized to train the detection algorithm on both raw data and reconstructed images, which permits further provisions for automatic detection. In this context, some routed flights of any new drone can be used to extract the ground truth data and a user can either feed the information directly to the processing unit 13 or store them to the memory 26 via the user interface 15, from where the signal processing function 25 collects the information as per user instructions and compares with the detected results. In this manner, the automation of the artificial intelligence methods can be implemented with least effort.

Figure 3:
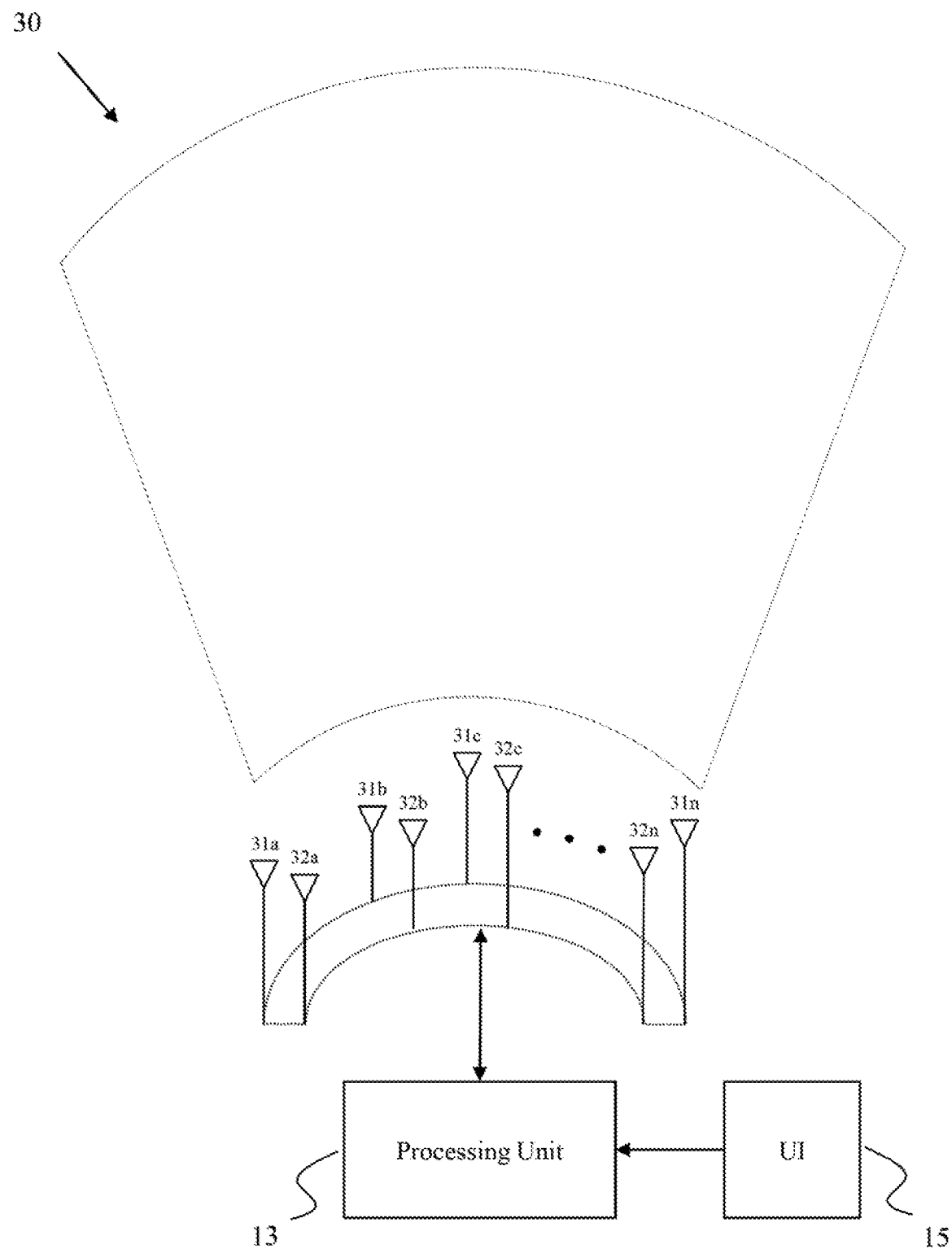
FIG. 3 shows a second exemplary embodiment of the system according to the first aspect of the invention.

In FIG. 3, a second exemplary embodiment of the inventive system 30 for detecting aircraft signatures is illustrated. In this context, instead of the multiple radar clusters an arching formation of a plurality of multistatic transmit antennas 31a, 31b, 31c, . . . , 31n and a plurality of multistatic receive antennas 32a, 32b, 32c, . . . , 32n are implemented. The transmit antennas 31a, 31b, 31c, . . . , 31n broadcast transmit signals one after another in a very quick successions to cover the potential aircraft fly-zone in a very small total time frame. In this manner, the complexity and cost are reduced in a large extend with a further reduction of antenna elements.

Figure 4:
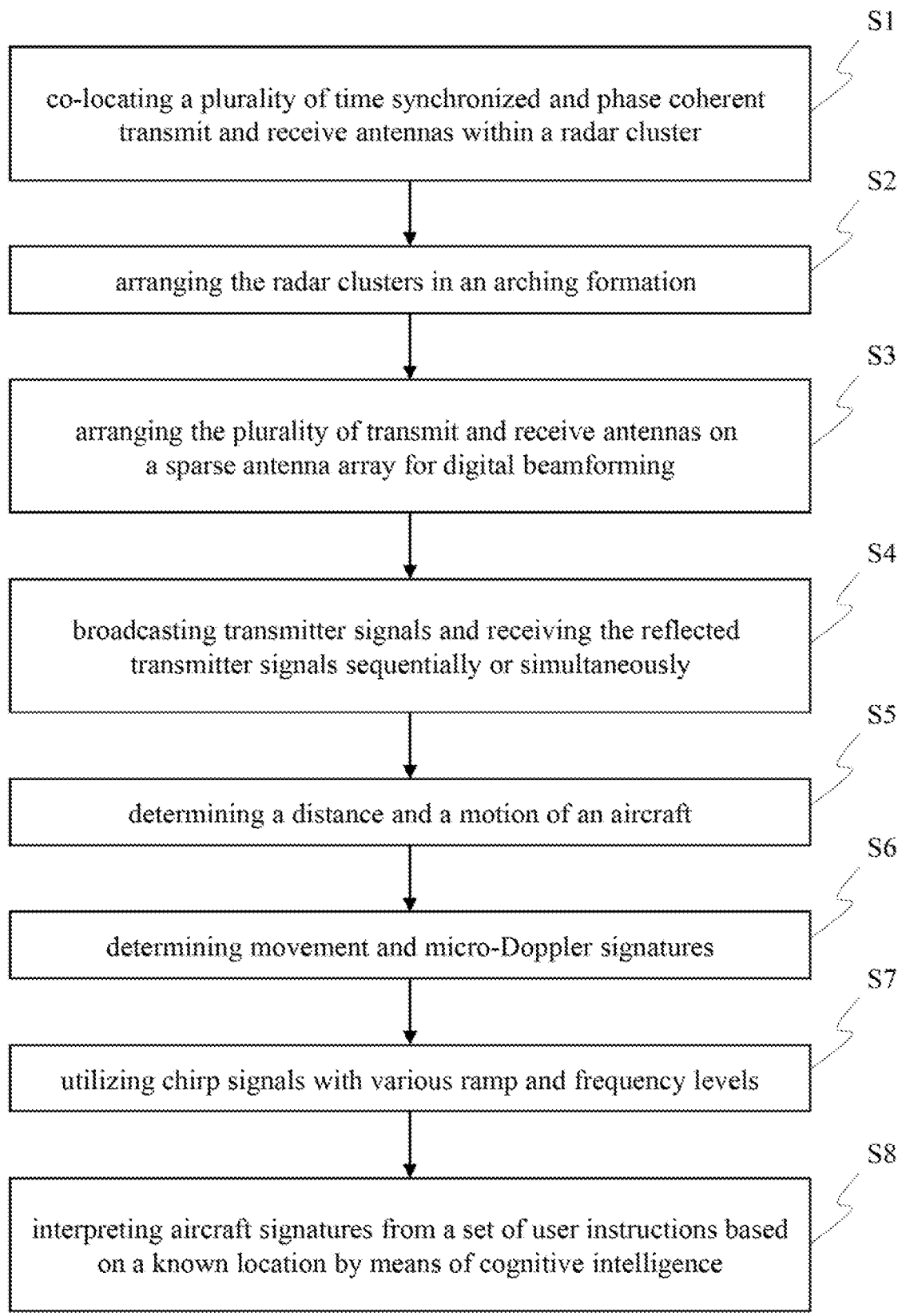
FIG. 4 shows a flow chart of an exemplary embodiment of the method according to the second aspect of the invention.

In FIG. 4, a flow chart of an exemplary embodiment of the inventive method for detecting aircraft signatures is illustrated. In a first step S1, a plurality of time synchronized and phase coherent transmit and receive antennas are co-located within a radar cluster. In a second step S2, the radar clusters are arranged in an arching formation. In a third step S3, the plurality of transmit and receive antennas are arranged on a sparse antenna array for digital beamforming.

Furthermore, in a fourth step S4, transmitter signals are broadcasted sequentially or simultaneously and the reflected transmitter signals are received sequentially or simultaneously. In a fifth step S5, a distance and a motion of an aircraft are determined.

Moreover, in a sixth step S6, movement signatures and micro-Doppler signatures of the aircraft are determined. In a seventh step S7, chirp signals having various ramp and frequency levels are utilized.

Finally, in an eighth step S8, aircraft signatures are interpreted from a set of user instructions based on a known location of the said aircraft by means of cognitive intelligence.

Within this application a signature can be any means to identify the aircraft or drone such as radar response pattern, Doppler response, rotor radar response or even a number plate.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A radar system for detecting aircraft signatures comprises a plurality of radar clusters comprising:
    a plurality of transmit antennas;
    a plurality of receive antennas; and
    a processor configured to compile multiple data sets received by the plurality of receive antennas, and to thereafter perform phase adjustments of the received data sets to increase power of a particular beam in a potential aircraft fly-zone; and
    wherein the plurality of transmit antennas and the plurality of receive antennas are co-located within at least one radar cluster on a sparse antenna array for digital beamforming and are arranged in a sparse array formation,
    wherein the plurality of transmit antennas are time synchronized and/or phase coherent with the plurality of receive antennas,
    wherein the processor is further configured to utilize multiple chirp signals with a range of ramps and frequency levels, comprising initial low frequency chirps followed by higher frequency chirps, to avoid aliasing at low frequencies and obtain higher resolution; and
    wherein the processor is further configured to interpret aircraft signatures from a set of user instructions based on a known location of an aircraft by means of cognitive intelligence, wherein the set of user instructions comprises ground truth data comprising both raw data and reconstructed images of the aircraft.

2. The system according to claim 1, wherein the plurality of radar clusters are stationary multistatic radar clusters.

3. The system according to claim 1, wherein the plurality of radar clusters are arranged in an arching formation to cover a portion of a potential aircraft fly-zone.

4. The system according to claim 1, wherein the plurality of transmit antennas are configured to broadcast transmitter signals sequentially or simultaneously, and wherein the plurality of receive antennas are configured to receive reflected transmitter signals sequentially or simultaneously.

5. The system according to claim 1, wherein the processor is configured to determine a distance of the aircraft corresponding to a delay of the broadcasted transmitter signals and reflected transmitter signals, and to detect a motion of the aircraft by analyzing Doppler shifts acquired from the reflected transmitter signals.

6. The system according to claim 5, wherein the processor is further configured to identify aircraft signatures to detect aircraft locations by:
    determining movement signatures corresponding to the motion of the aircraft if the aircraft is moving; and
    determining micro-Doppler signatures corresponding to micro-Doppler analysis of phase shifts if the aircraft is stationary.

7. The system according to claim 1, wherein the system further comprises a plurality of multistatic transmit antennas and a plurality of multistatic receive antennas which are arranged in an arching formation.

8. The system according to claim 7, wherein the plurality of transmit antennas are configured to broadcast in quick successions in order to cover the potential aircraft fly-zone in a very small total time frame.

9. The system according to claim 1, wherein the aircraft signatures to be detected are drone signatures.

10. A method for detecting aircraft signatures in a radar system, the method comprising the steps of:
    compiling multiple data sets, received by the radar system via a plurality of receive antennas which are co-located with a plurality of transmit antennas that are time synchronized and/or phase coherent with the plurality of receive antennas, wherein the plurality of transmit antennas and the plurality of receive antennas are co-located within at least one of a plurality of radar clusters on a sparse antenna array for digital beamforming and are arranged in a sparse array formation, and thereafter performing phase adjustments of the received data sets to increase power of a particular beam in a potential aircraft fly-zone;
    utilizing multiple chirp signals with a range of ramps and frequency levels, comprising initial low frequency chirps followed by higher frequency chirps, to avoid aliasing at low frequencies and obtain higher resolution; and
    interpreting aircraft signatures from a set of user instructions based on a known location of an aircraft by means of cognitive intelligence, wherein the set of user instructions comprises ground truth data comprising both raw data and reconstructed images of the aircraft.

11. The method according to claim 10, further comprising the step of:
    arranging the plurality of radar clusters in an arching formation to cover a portion of a potential aircraft fly-zone.

12. The method according to claim 10, further comprising the steps of:
    broadcasting, via the plurality of transmit antennas, transmitter signals sequentially or simultaneously; and
    receiving reflected transmitter signals sequentially or simultaneously.

13. The method according to claim 10, further comprising the steps of:
    determining a distance of the aircraft corresponding to a delay of the broadcasted transmitter signals and reflected transmitter signals; and
    detecting a motion of the aircraft by analyzing Doppler shifts acquired from the reflected transmitter signals.

14. The method according to claim 10, further comprising the steps of:
    determining movement signatures corresponding to the motion of the aircraft if the aircraft is moving; and
    determining micro-Doppler signatures corresponding to micro-Doppler analysis of phase shifts if the aircraft is stationary.

* * * * *